United States Patent
Ferguson et al.

(10) Patent No.: US 11,485,247 B2
(45) Date of Patent: Nov. 1, 2022

(54) DISPATCH-BASED CHARGING FOR ELECTRIC VEHICLE FLEET

(71) Applicant: GM Cruise Holdings LLC, San Francisco, CA (US)

(72) Inventors: Kenneth Ramon Ferguson, Scottsdale, AZ (US); Chase Kaufman, Fountain Hills, AZ (US); Adam Mandel-Senft, Phoenix, AZ (US); Jeffrey Brandon, Phoenix, AZ (US); Brett Lee Rogers, New Hudson, MI (US)

(73) Assignee: GM Cruise Holdings LLC, San Francisco, CA (US)

(*) Notice: Subject to any disclaimer, the term of this patent is extended or adjusted under 35 U.S.C. 154(b) by 310 days.

(21) Appl. No.: 16/826,396

(22) Filed: Mar. 23, 2020

(65) Prior Publication Data

US 2021/0291687 A1    Sep. 23, 2021

(51) Int. Cl.
*B60L 53/60* (2019.01)
*G08G 1/00* (2006.01)
*G05D 1/00* (2006.01)
*G05D 1/02* (2020.01)

(52) U.S. Cl.
CPC ............ *B60L 53/60* (2019.02); *G05D 1/0083* (2013.01); *G05D 1/0291* (2013.01); *G08G 1/202* (2013.01); *G05D 2201/0212* (2013.01)

(58) Field of Classification Search
CPC ...... B60L 53/60; Y02T 10/7072; Y02T 10/72; G05D 1/0291; G08G 1/202
See application file for complete search history.

(56) References Cited

U.S. PATENT DOCUMENTS

| 2018/0131204 A1* | 5/2018 | Weicker | B60L 58/15 |
| 2019/0039467 A1* | 2/2019 | Hortop | B60L 58/12 |

* cited by examiner

*Primary Examiner* — Alan D Hutchinson
*Assistant Examiner* — Andy Schneider
(74) *Attorney, Agent, or Firm* — Akona IP PC

(57) ABSTRACT

An electric vehicle (EV) is charged according to a selected charging rate. An available dispatch time is determined based on a current charge level of a battery of the EV, a first charging rate, and a target charge level. An anticipated dispatch time is determined based on predicted demand for a fleet of EVs that includes the EV. If the available dispatch time is later than the anticipated dispatch time, the first charging rate is selected; if the available dispatch time is earlier than the anticipated dispatch time, a second charging rate that is lower than the first charging rate is selected. The second charging rate may be a rate that charges the battery of the EV to at least the target charge level in time for the anticipated dispatch time.

19 Claims, 3 Drawing Sheets

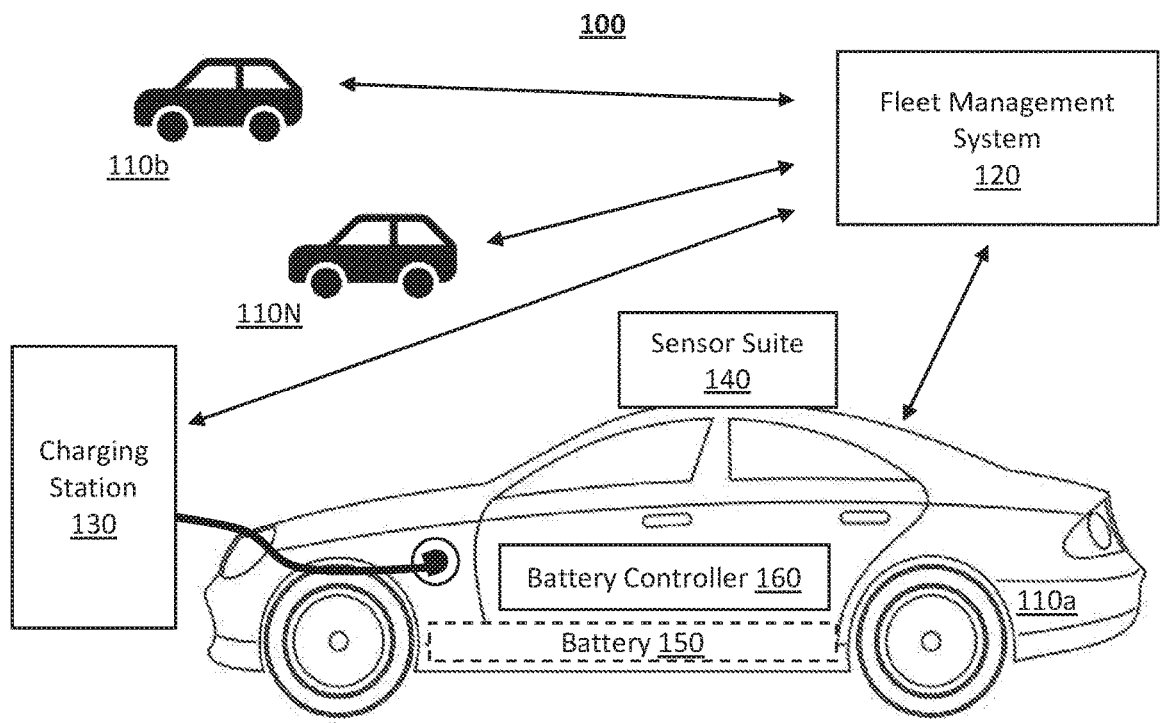
Figure 1
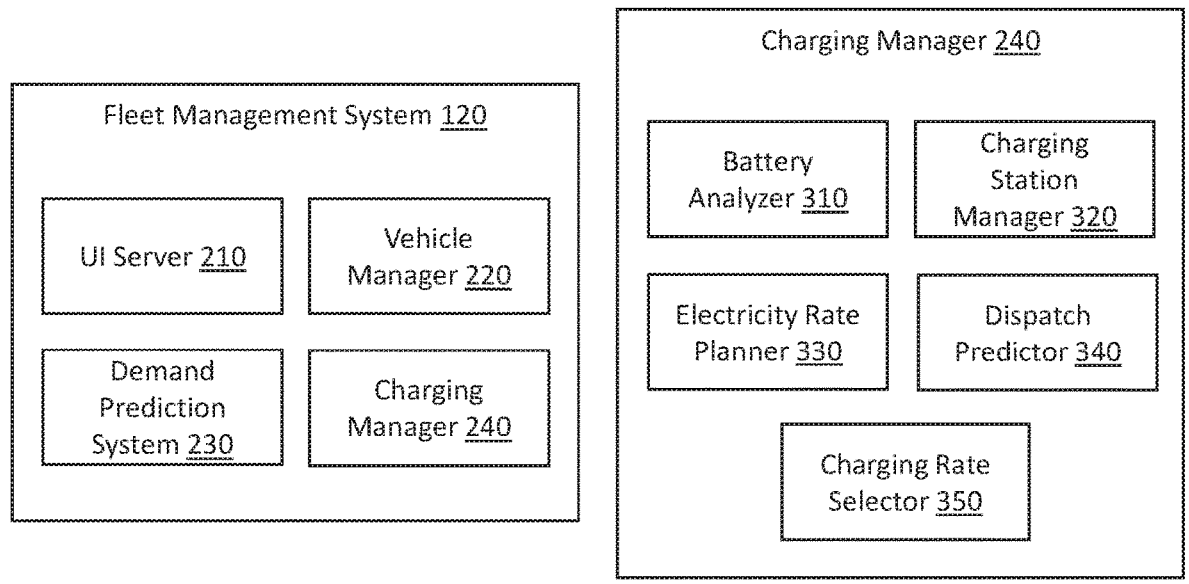
Figure 2
Figure 3

DISPATCH-BASED CHARGING FOR ELECTRIC VEHICLE FLEET

TECHNICAL FIELD OF THE DISCLOSURE

The present disclosure relates generally to battery-powered electric vehicles and, more specifically, to systems and methods for charging battery-powered vehicles in a fleet based on dispatch predictions.

BACKGROUND

Electric vehicles (EVs) are powered by batteries that need to be periodically charged. Modern direct current (DC) fast-charging electric vehicle chargers can quickly charge EV batteries. For example, a DC fast-charging EV charger may increase the range of an EV by 100 miles in 30 minutes. However, routinely charging a battery at such a high rate can reduce the longevity and capacity of the battery. In addition, for fleet operations, it can be useful to keep some subsystems, such as communications systems, of the EV running while the EV is not in service. If the battery reaches full charge before the EV is put into service again, the subsystems that remain on before service deplete the battery. Then, when the EV is put into service, the battery is no longer fully charged. To avoid this, the EV can continue charging until it is put into service, so that EV has a fully charged battery when it goes into service. However, this continuous charging also degrades the battery.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1 is a block diagram illustrating a system including an example EV in a fleet of EVs in which dispatch-based charging according to some embodiments of the present disclosure may be implemented;

FIG. 2 is a block diagram illustrating a fleet management system according to some embodiments of the present disclosure;

FIG. 3 is a block diagram illustrating a charging manager according to some embodiments of the present disclosure;

DESCRIPTION OF EXAMPLE EMBODIMENTS OF THE DISCLOSURE

Overview

Figure 4:
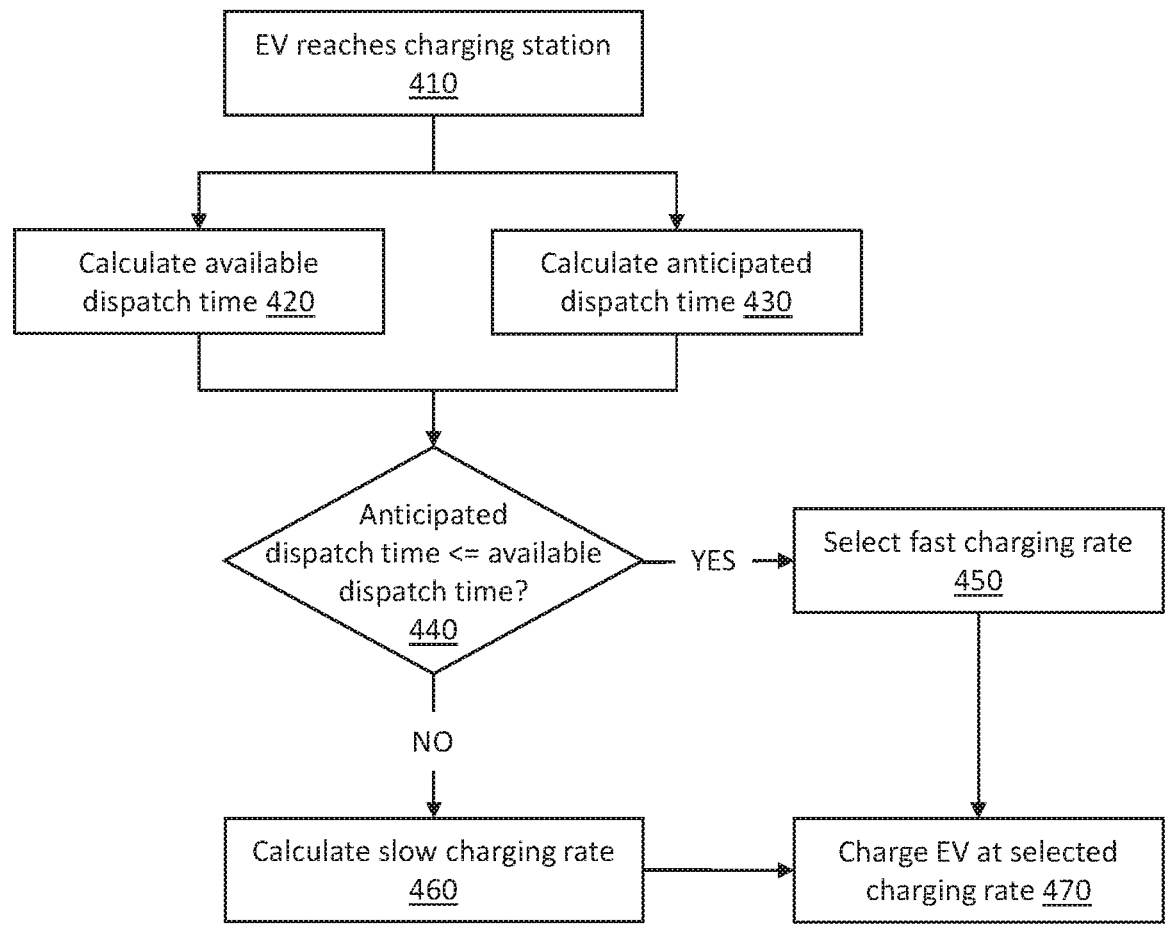
FIG. 4 is a flowchart showing a process for selecting and applying a charging rate for an EV according to some embodiments of the present disclosure.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

Charging stations can deliver different rates of charge. For example, a DC fast-charge charger may be capable of delivering up to 200 kW, but an EV can request a lower charge rate, such as 100 kW, if the EV battery cannot handle the highest charge rate provided by the charger. EV batteries may receive different charge rates as well. For example, a DC fast-charge charger may deliver up to 100 kW, while an alternating current (AC) level 2 charger may deliver around 20 kW.

In current EV fleet management, an EV battery is charged at the highest possible rate for a given EV battery and charging station combination, so that the EVs recharge quickly and can be put back into service. However, if an EV is not immediately needed, it is undesirable for the EV to be out of service with a fully charged battery for a long period of time. Keeping a battery at a high charge level while the EV is not in use degrades the battery. In addition, for fleet operations, it can be useful to keep some subsystems of the EV running while the EV is not in service. For example, a communications system can be kept running so that a fleet manager can communicate with the EV, e.g., to transmit instructions to go into service, receive status information, send software upgrades, etc. For autonomous EVs, it can be useful to keep autonomous driving hardware (e.g., sensor systems, processing systems) powered on for routine use and monitoring, and to avoid a lengthy restart procedure. If the EV is not connected to a charger, using these subsystems drain the battery, and the EV does not have a fully charged battery when it goes into service. Leaving the EV connected to the charger even after the battery is fully charged ensures that the battery remains fully charged; however, leaving the EV plugged into a charger that provides more power than needed to run these subsystems degrades the battery.

Dispatch-based charging overcomes these problems by determining a charging rate for an EV based on a predicted time for the EV to be dispatched for service. If a fleet management system expects that an EV is needed for service in the near future, the EV charges at a fast charging rate, e.g., the fastest rate that the charging station can provide, or the fastest rate that the EV battery accepts. If the fleet management system determines that the EV is not needed for service in the near future, e.g., the EV is not predicted to be dispatched until after the EV battery would receive a full charge at the fast charging rate, the fleet management system selects a slower charging rate to charge the EV battery. The slower charging rate reduces strain on the EV battery while allowing the EV to be sufficiently charged by the time the EV is expected to be dispatched for service.

Embodiments of the present disclosure provide a method for selecting a charging rate for an electric vehicle (EV), and a non-transitory computer-readable storage medium storing instructions that cause a processor to perform the method for selecting a charging rate for an EV. The method includes determining an available dispatch time for the EV based on a current charge level of a battery of the EV and a first charging rate; determining an anticipated dispatch time for the EV based on predicted demand for a fleet of EVs, the fleet comprising the EV; in response to determining that the available dispatch time is earlier than the anticipated dispatch time, selecting a second charging rate that is lower than the first charging rate; and instructing the EV to be charged at the second charging rate.

Further embodiments of the present disclosure provide a system for charging an EV of a fleet of EVs. The system includes a charging manager and a charging station. The charging manager is configured to determine an available dispatch time for the EV based on a current charge level of a battery of the EV and a first charging rate; determine an anticipated dispatch time for the EV based on predicted demand for the fleet of EVs; and in response to determining that the available dispatch time is earlier than the anticipated dispatch time, select a second charging rate that is lower than the first charging rate. The charging station is configured to receive an instruction to charge the EV at the second charging rate, and charge the EV at the second charging rate.

As will be appreciated by one skilled in the art, aspects of the present disclosure, in particular aspects of dispatch-based charging for electric vehicle fleets, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

Example System for Dispatch-Based Charging

FIG. 1 is a block diagram illustrating a system 100 including an example EV in a fleet of EVs in which dispatch-based charging according to some embodiments of the present disclosure may be implemented. The system 100 includes a fleet of electric vehicles (EVs) 110, including EV 110a, EV 110b, and EV 110N, a fleet management system 120, and a charging station 130. For example, a fleet of EVs may include a number N of EVs, e.g., EV 110a through EV 110N. Some or all of the EVs 110 may be autonomous vehicles (AVs). EV 110a includes a sensor suite 140, a battery 150, and a battery controller 160. EVs 110b through 110N also include the sensor suite 140, battery 150, and battery controller 160. A single EV in the fleet is referred to herein as EV 110, and the fleet of EVs is referred to collectively as EVs 110. The fleet management system 120 determines an anticipated dispatch time for the EV 110a. Based on the anticipated dispatch time and a time to charge the EV at a fast charging rate (e.g., the fastest rate provided by the charging station 130), either the fast charging rate or a different, slower charging rate is selected. The charging station 130 charges the battery 150 according to the selected charging rate.

In some embodiments, each EV 110 is a fully autonomous electric automobile. In other embodiments, each EV 110 may additionally or alternatively be another semi-autonomous or fully autonomous vehicle; e.g., a boat, an unmanned aerial vehicle, a driverless car, etc. Additionally, or alternatively, the EV 110 may be a vehicle that switches between a semi-autonomous state and a fully autonomous state and thus, the EV may have attributes of both a semi-autonomous vehicle and a fully autonomous vehicle depending on the state of the vehicle. In some embodiments, some or all of the EVs 110 are non-autonomous electric vehicles.

In embodiments where the EVs 110 are autonomous, each EV 110 may include a throttle interface that controls an engine throttle, motor speed (e.g., rotational speed of electric motor), or any other movement-enabling mechanism; a brake interface that controls brakes of the EV (or any other movement-retarding mechanism); and a steering interface that controls steering of the EV (e.g., by changing the angle of wheels of the EV). The EV 110 may additionally or alternatively include interfaces for control of any other vehicle functions; e.g., windshield wipers, headlights, turn indicators, air conditioning, etc.

The EV 110 includes a sensor suite 140, which includes a computer vision ("CV") system, localization sensors, and driving sensors. For example, the sensor suite 140 may include photodetectors, cameras, radar, sonar, lidar, GPS, wheel speed sensors, inertial measurement units (IMUS), accelerometers, microphones, strain gauges, pressure monitors, barometers, thermometers, altimeters, ambient light sensors, etc. The sensors may be located in various positions in and around the EV 110.

An onboard computer (not shown in FIG. 1) is connected to the sensor suite 140 and functions to control the EV 110 and to process sensed data from the sensor suite 140 and/or other sensors in order to determine the state of the EV 110. Based upon the vehicle state and programmed instructions, the onboard computer modifies or controls behavior of the EV 110. The onboard computer is preferably a general-purpose computer adapted for I/O communication with vehicle control systems and sensor suite 140, but may additionally or alternatively be any suitable computing device. The onboard computer is preferably connected to the Internet via a wireless connection (e.g., via a cellular data connection). Additionally or alternatively, the onboard computer may be coupled to any number of wireless or wired communication systems.

The battery 150 is a rechargeable battery that powers the EV 110. The battery 150 may be a lithium-ion battery, a lithium polymer battery, a lead-acid battery, a nickel-metal hydride battery, a sodium nickel chloride ("zebra") battery, a lithium-titanate battery, or another type of rechargeable battery. In some embodiments, the EV 110 is a hybrid electric vehicle that also includes an internal combustion engine for powering the EV 110, e.g., when the battery 150 has low charge.

The battery controller 160 controls the charging and operation of the battery 150. The battery controller 160 may interface with battery sensors for determining a current charge level of the battery 150. The battery controller 160 may interface with the charging station 130 to initiate charging, request charge at a selected charging rate, and end a charging session. In some embodiments, the battery controller 160 determines a charging rate for the battery 150 based on dispatch information received from the fleet management system 120, the current charge level of the battery 150, and/or other factors. In other embodiments, the battery controller 160 receives a charging rate selected by the fleet management system 120, the charging station 130, or another source. The battery controller 160 may coordinate providing power to various subsystems; for example, during charging, the battery controller 160 provides power to one subset of subsystems (e.g., a communication subsystem and an autonomous driving sensor subsystem) and does not provide power to a different set of subsystems (e.g., a propulsion subsystem).

In some embodiments, the EV 110 includes multiple batteries 150, e.g., a first battery used to power vehicle propulsion, and a second battery used to power AV hardware (e.g., the sensor suite 140 and the onboard computer). In such embodiments, the battery controller 160 may manage charging of the multiple batteries, e.g., by dividing received power between the two batteries. The battery controller 160 may determine a charging rate for each respective battery and, based on the charging rates, a charging rate to receive from the charging station 130. The battery controller 160 may include an on-board charger that converts alternating current (AC) to direct current (DC). The on-board charger is used when the EV 110 is charged by a charging station 130 that delivers AC; if the charging station 130 delivers DC, the on-board charger is bypassed.

The fleet management system 120 manages the fleet of EVs 110. The fleet management system 120 may manage a service that provides or uses the EVs 110, e.g., a service for providing rides to users with the EVs 110, or a service that delivers items using the EVs (e.g., prepared foods, groceries, packages, etc.). The fleet management system 120 may select an EV from the fleet of EVs 110 to perform a particular service or other task, and instruct the selected EV (e.g., EV 110a) to autonomously drive to a particular location (e.g., a delivery address). The fleet management system 120 also manages fleet maintenance tasks, such as charging and servicing of the EVs 110. As shown in FIG. 1, each of the EVs 110 communicates with the fleet management system 120. The EVs 110 and fleet management system 120 may connect over a public network, such as the Internet. The fleet management system 120 is described further in relation to FIG. 2.

The charging station 130 charges batteries of EVs 110. The charging station 130 shown in FIG. 1 has a cord and a plug; the plug is plugged into a socket of the EV 110a. In other embodiments, the charging station 130 is a wireless charger, e.g., an inductive charger, or another type of charger. The charging station 130 has a maximum charging rate, and the charging station 130 is able to charge a connected EV 110 at the maximum charging rate or at a lower rate. The charging station 130 may be an AC charger or DC charger. The charging station 130 may communicate with the EV 110a through a wired connection (e.g., through the cord and plug shown in FIG. 1) or through a wireless connection (e.g., Bluetooth or WiFi). The charging station 130 may also communicate with the fleet management system 120, e.g., over the Internet. The charging station 130 may receive a selected charging rate to charge the EV 110 from the fleet management system 120 or from the EV 110.

The fleet management system 120 may operate a network of charging stations 130. The network of charging stations may include a single type of charging stations (e.g., DC fast-charging stations), or a mix of charging stations (e.g., some AC level 2 charging stations, and some DC charging stations). Charging stations in the network may be distributed across one or more geographic regions in which the fleet of EVs 110 provides service. Charging stations may be included in EV facilities operated by the fleet management system 120, e.g., facilities for storing, charging, and/or maintaining EVs. In some embodiments, the EVs 110 may use charging stations outside of the network operated by the fleet management system 120, e.g., charging stations available to the public, charging stations in private homes, charging stations on corporate campuses, etc.

Example Fleet Management System

FIG. 2 is a block diagram illustrating the fleet management system 120 according to some embodiments of the present disclosure. The fleet management system 120 includes a UI (user interface) server 210, a vehicle manager 220, a demand prediction system 230, and a charging manager 240. In alternative configurations, different and/or additional components may be included in the fleet management system 120. Further, functionality attributed to one component of the fleet management system 120 may be accomplished by a different component included in the fleet management system 120 or a different system than those illustrated.

The UI server 210 is configured to communicate with client devices that provide a user interface to users. For example, the UI server 210 may be a web server that provides a browser-based application to client devices, or the UI server 210 may be a mobile app server that interfaces with a mobile app installed on client devices. The user interface enables the user to access a service of the fleet management system 120, e.g., to request a ride from an EV 110, or to request a delivery from an EV 110.

The vehicle manager 220 manages and communicates with a fleet of EVs, including EVs 110a through 110N. The vehicle manager 220 may assign EVs 110 to various tasks and direct the movements of the EVs 110 in the fleet. For example, the vehicle manager 220 assigns an EV 110 to perform a service requested by a user through the UI server 210. The vehicle manager 220 may instruct EVs 110 to drive to other locations while not servicing a user, e.g., to improve geographic distribution of the fleet, to anticipate demand at particular locations, to drive to a charging station 130 for charging, etc. The vehicle manager 220 also instructs EVs 110 to return to EV facilities for recharging, maintenance, or storage.

The demand prediction system 230 predicts a demand for the fleet of EVs 110. The demand prediction system 230 retrieves historical data describing previous demands on the fleet of EVs 110, e.g., data describing numbers of assignments, durations of assignments, locations of assignments, and timing of assignments (day of week, time of day). The demand prediction system 230 uses this historical data to predict the demand for the fleet of EVs. In one example, the demand prediction system 230 predicts the demand levels for a period of time in the future, e.g., predicted demand over the next 5 hours, or predicted demand over the next 24 hours. In some embodiments, the demand prediction system 230 predicts an overall demand level or curve for the whole fleet, e.g., if the fleet is dedicated to one task (e.g., food delivery) and a particular region. In other embodiments, the demand prediction system 230 determines different demand levels or curves for various segments of the fleet, e.g., for a particular type of EVs (e.g., trucks, sedans, or luxury cars), for EVs within a particular geographic region, for EVs assigned to a particular function (e.g., EVs assigned to hot food delivery, EVs assigned to package delivery, or EVs assigned to giving rides to users), or a combination of factors (e.g., luxury cars used for a ride-sharing service within Austin, Tex.).

The demand prediction system 230 may predict demands based on demand patterns. For example, the demand prediction system 230 may use historical data to calculate demand curves that are expected to repeat on a periodic basis, e.g., a Wednesday demand curve, or a weekday demand curve.

The demand prediction system 230 may also predict demands based on data describing upcoming events or anticipated conditions. For example, the demand prediction system 230 receives data describing upcoming events, such as holidays, sports games, and concerts. The demand prediction system 230 may receive relevant geographic locations of these events, such as the location of a stadium hosting a sports game or concert, or the location of a parade celebrating a holiday. As another example, the demand prediction system 230 receives predicted weather conditions. The demand prediction system 230 may adjust a demand curve based on this data, e.g., by adjusting a Wednesday demand curve upward in the area around a sports stadium to account for a playoff game, or by adjusting a demand curve downward in response to predicted inclement weather. The demand prediction system 230 may retrieve relevant historical data to calculate a demand curve for a specific demand (e.g., predicting demand on New Year's Eve based on the previous year or multiple years). The demand prediction system 230 may receive manual adjustments or manually-input demand curves for special events or conditions for which historical data is inadequate or not available.

The charging manager 240 determines charging rates for the EVs 110. To determine a charging rate for a particular EV 110, e.g., EV 110a, the charging manager 240 retrieves information about the battery 150 (e.g., current charge level, maximum charging rate, capacity), the charging station 130 (e.g., maximum charging rate, charging queue), and anticipated demand information for the EV 110a or the fleet of EVs 110. The charging manager 240 may retrieve additional information, such as electricity rates, battery degradation data, weather, data, etc. The charging manager 240 determines a charging rate for the EV 110a based on the retrieved data. For example, the charging manager 240 may apply decision making rules or perform an optimization algorithm to determine a charging rate for the EV 110a. The charging manager 240 is described further in relation to FIG. 3.

Example Charging Manager

FIG. 3 is a block diagram illustrating the charging manager 240 according to some embodiments of the present disclosure. The charging manager 240 includes a battery analyzer 310, a charging station manager 320, an electricity rate planner 330, a dispatch predictor 340, and a charging rate selector 350. In alternative configurations, different and/or additional components may be included in the charging manager 240. Further, functionality attributed to one component of the charging manager 240 may be accomplished by a different component included in the charging manager 240 or a different system than those illustrated. While the charging manager 240 is shown as a subsystem of the fleet management system 120, in other embodiments, some or all of the components of the charging manager 240 are integrated into other systems, such as the charging station 130 or the EV 110. For example, the charging station manager 320, or some aspects of the charging station manager 320, may be implemented by the charging station 130. As another example, the battery analyzer 310 may be implemented by the EV 110. As a further example, the charging rate selector 350 may be implemented by either the charging station 130 or the EV 110.

The battery analyzer 310 retrieves and processes data related to the battery 150. The battery analyzer 310 may store data describing previous charge events and discharge events of the battery 150 and/or a set of batteries 150 the fleet of EVs 110. For example, the data describing charge events includes charge levels, changes in the charge level, and charging rate supplied by a power source (e.g., a charging station 130, regenerative braking, or other sources). The data describing discharge events may include charge levels, changes in charge levels, power draws in the battery (e.g., power draws from the propulsion system, HVAC system, AV sensors, onboard computer, etc.), and conditions that impact the power draws (e.g., weather conditions, roadway conditions such as speed, terrain, frequency of stops, etc.). The battery analyzer 310 can predict the response of the battery 150 to planned charge and discharge events based on the historical battery data for the battery 150 and/or battery data for multiple batteries across the fleet of EVs 110.

The battery analyzer 310 may determine an available dispatch time for the EV based on the current charge level of the battery 150, a first charging rate provided by the charging station 130, and a target charge level. The current charge level of the battery 150 is received from the EV 110. The first charging rate may be determined based on data describing the battery 150 and the charging station 130. The first charging rate may be a maximum charging rate provided by the charging station 130. Alternatively, the first charging rate may be a maximum charging rate that the battery 150 is configured to receive, e.g., if the maximum charging rate for the battery 150 is lower than the maximum charging rate provided by the charging station 130.

The battery analyzer 310, in conjunction with the dispatch predictor 340, determines a target charge level for the battery 150 to reach during charging. In an embodiment, the target charge level is a full charge. In another embodiment, the target charge level is a charge level that is sufficient to carry out a predicted usage of the EV 110 after the EV 110 is charged, e.g., a charge that allows the EV 110 to travel a certain number of miles, or a certain period of time. The target charge level may include a buffer, e.g., in case the EV 110 is rerouted or experiences unexpected power draws. The predicted usage of the EV 110 is determined by the dispatch predictor 340, described below.

The battery analyzer 310 calculates the target charge level for carrying out the predicted usage based on data describing historical discharge rates of the battery 150 and/or fleet-wide battery discharge data. The battery analyzer 310 may incorporate additional data relating to expected power usage when calculating the target charge level. For example, the battery analyzer 310 retrieves data describing weather conditions in the environment of the EV 110 and, based on the weather conditions, calculates an anticipated power draw on the battery 150 for powering the HVAC system of the EV 110 during the predicted usage. As another example, the battery analyzer 310 retrieves data describing a projected route of the EV 110 and determines the expected power draw on the battery 150 based on the projected route. The battery analyzer 310 may determine the expected power draw based on the length of the route and data describing the roadways that the route traverses. For example, a route that travels over hillier or rougher terrain draws more power than a route that travels over flat terrain; a route that is mainly on city streets draws less power than a route that is mainly on highways. The battery analyzer 310 may further receive traffic data, or projected traffic data, for the projected route of the EV 110 and determine the expected power draw based on the traffic data. For example, the battery analyzer 310 may calculate an expected power draw for a route during rush hour that is higher than the route during midday. The traffic data may be received from a traffic data source, or the traffic data may be compiled by the fleet manager 120 based on observed traffic and speeds of EVs in the fleet. The battery analyzer 310 may train a model for predicting power demands based on the historical battery data and use this model to determine the target charge level for carrying out the predicted usage.

The battery analyzer 310 also uses the historical charging data to determine the length of time for the battery 150 to reach the target charge level from the current charge level at the first charging rate. The battery analyzer 310 may account for a power draw on the battery 150 during charging when calculating the length of time to reach the target charge level. For example, some subsystems, such as the communications subsystem, onboard computer, sensor suite 140, and/or other systems may continue to draw power while the battery 150 is charging. After calculating the length of time for the battery 150 to reach the target charge level, the battery analyzer 310 determines an available dispatch time for the EV 110 by adding the calculated length of time to reach the charge level to the current time. The battery analyzer 310 may continually update the available dispatch time during charging in response to updated data about the power draws, target charge level, and current charge level.

The battery analyzer 310 may also assess and predict degradation of the battery 150 based on the historical battery data and fleet-wide battery information. In an example, the battery analyzer 310 retrieves data describing degradation costs on the battery 150 due to charging, including degradation costs of charging the battery 150 at different charging rates, and degradation costs of storing the battery 150 at different charge levels. In general, storing a battery with a higher charge degrades the battery more than storing a battery at a lower charge, and charging a battery at a faster rate degrades the battery more than charging the battery at a slower rate. The battery analyzer may calculate the degradation costs for a particular battery 150 based on the age of the battery, current state of the battery (e.g., full charge level that the battery can currently receive vs. full charge level when new; current time to reach full charge from empty vs. time to reach full charge when new), environmental conditions, or other factors in combination with historical battery data.

The charging station manager 320 retrieves and processes data related to the charging stations 130. The charging station manager 320 may maintain data describing the type and maximum charging rate for each charging station 130 that charges the fleet of EVs 110. The charging station manager 320 may maintain a charging queue for each charging station 130. The charging station manager 320 may instruct an EV 110 to charge at a particular charging station 130 based on the location of the EV 110 relative to the charging station 130, whether there is an EV currently charging at the charging station 130 and the expected remaining charge duration of the currently charging EV, a queue of EVs waiting to charge at the charging station 130, the maximum charging rate provided by the charging station 130, or other factors.

The electricity rate planner 330 determines energy costs for charging the battery 150. In some embodiments, the electricity rate planner 330 retrieves data describing current and future energy costs (e.g., energy costs for the next 24 hours) from an electricity company or another source. In some embodiments, the electricity rate planner 330 determines anticipated energy costs over a period of time (e.g., the next 12 hours) based on the current energy cost and historical data stored by the electricity rate planner 330 or retrieved from another source. The electricity rate planner 330 may determine different anticipated energy costs for multiple different charging stations 130, e.g., charging stations that receive power from different energy companies may have different rates, and a charging station that is fully or partially solar powered may have a lower rate or no fee.

The dispatch predictor 340 determines anticipated demands and usages for EVs 110. As discussed above, in some embodiments, the battery analyzer 310 determines a target charge level for the battery 150 based on a predicted usage of the EV 110. The predicted usage may be a task or set of tasks, such as one or more tasks received by the fleet management system 120 and assigned to the EV 110, or a predicted task or set of tasks. The predicted usage may include a projected route, e.g., a route that the EV 110 travels to carry out the task or set of tasks. The predicted usage may also include a time or time frame for traveling the projected route, which can be used to determine projected traffic data. In another embodiment, the predicted usage is a time window during which the EV 110 is expected to provide service, e.g., the dispatch predictor 340 determines that demand is predicted to spike during a particular three hour window, so the predicted usage involves driving during this three hour window. The dispatch predictor 340 may determine the predicted usage based on fleet demand information provided by the demand prediction system 230.

The dispatch predictor 340 also determines an anticipated dispatch time for the EV 110 based on predicted demand for the fleet of EVs determined by the demand prediction system 230. For example, in response to receiving an indication that an EV 110 has connected to a charging station 130, the dispatch predictor 340 may retrieve a predicted demand curve from the demand prediction system 230 and determine the anticipated dispatch time accordingly. The demand curve may represent the likelihood that any EV 110 is assigned to a task as a function of time. The anticipated dispatch time may be based on anticipated dispatch times determined for other EVs in the fleet; for example, if the demand prediction system 230 determines that 75-100 assignments are likely to be received in the next hour, and the dispatch predictor 340 has previously determined that over 100 EVs in the fleet are available to be dispatched to cover the expected demand for the next hour, the dispatch predictor 340 may determine that the EV 110 is not likely to be assigned within the next hour.

In one embodiment, the dispatch predictor 340 determines the anticipated dispatch time for the EV 110 based on a segment of the EV fleet to which the EV 110 belongs. For example, the dispatch predictor 340 retrieves data describing the EV 110, such as service(s) provided (e.g., rideshare or delivery), vehicle features (e.g., temperature-controlled compartments, cargo capacity, number of seats), geographic location, battery capacity, etc. The dispatch predictor 340 identifies a segment or segments of the fleet of EVs to which the EV 110 belongs based on the retrieved data, e.g., an EV with both hot and cold cargo sections belongs to a segment of grocery delivery EVs and a segment of hot food delivery EVs. The dispatch predictor 340 retrieves a predicted demand curve from the demand prediction system 230 for the identified segment(s) of the fleet. The dispatch predictor 340 then determines the anticipated dispatch time for the EV based on the predicted demand curve(s). The dispatch predictor 340 may also retrieve segment data describing other EVs in the identified segment(s) and determine the anticipated dispatch time based on the segment data. Segment data for a segment may include, for example, locations of other EVs in the segment, battery charge levels for other EVs in the segment, task assignments already assigned to other EVs in the segment, and task predictions for other EVs in the segment.

The charging rate selector 350 selects a charging rate for the battery 150 based on data the charging rate selector 350 receives from some or all of the battery analyzer 310, charging station manager 320, electricity rate planner 330, and dispatch predictor 340. The charging rate selector 350 compares the available dispatch time (i.e., the time at which the battery reaches the target charge level at the first charging rate) to the anticipated dispatch time determined by the dispatch predictor 340. If the anticipated dispatch time is earlier than or the same as the available dispatch time, the charging rate selector 350 selects the first charging rate, e.g., the maximum charging rate that the battery 150 can receive from the charging station 130. If the anticipated dispatch time is later than the available dispatch time, the charging rate selector 350 selects a second charging rate, which may be lower than the first charging rate. The charging rate selector 350 instructs the EV 110 to be charged at the selected charging rate, e.g., by transmitting an instruction to the EV 110 or to the charging station 130.

The charging rate selector 350 selects the second charging rate as a rate that charges the battery 150 to at least the target battery level at or before the anticipated dispatch time. The charging rate selector 350 may balance various factors in selecting the second charging rate, such as the cost of electricity, degradation costs of different charging rates and charge levels, weather conditions, charging station availability, and whether there is a queue of EVs for charging at the charging station 130. The charging rate selector 350 may apply a set of rules to these factors to select a charging rate. The charging rate selector 350 may weigh these factors or perform a multi-factor optimization to select the second charging rate. In one example, the charging rate selector retrieves data describing various costs on the battery, e.g., degradation costs associated with charging rates, degradation costs associated with charging levels, and energy costs for charging the battery, and calculates the second charging rate as an optimal charging rate that minimizes overall costs on the battery 150.

Figure 5:
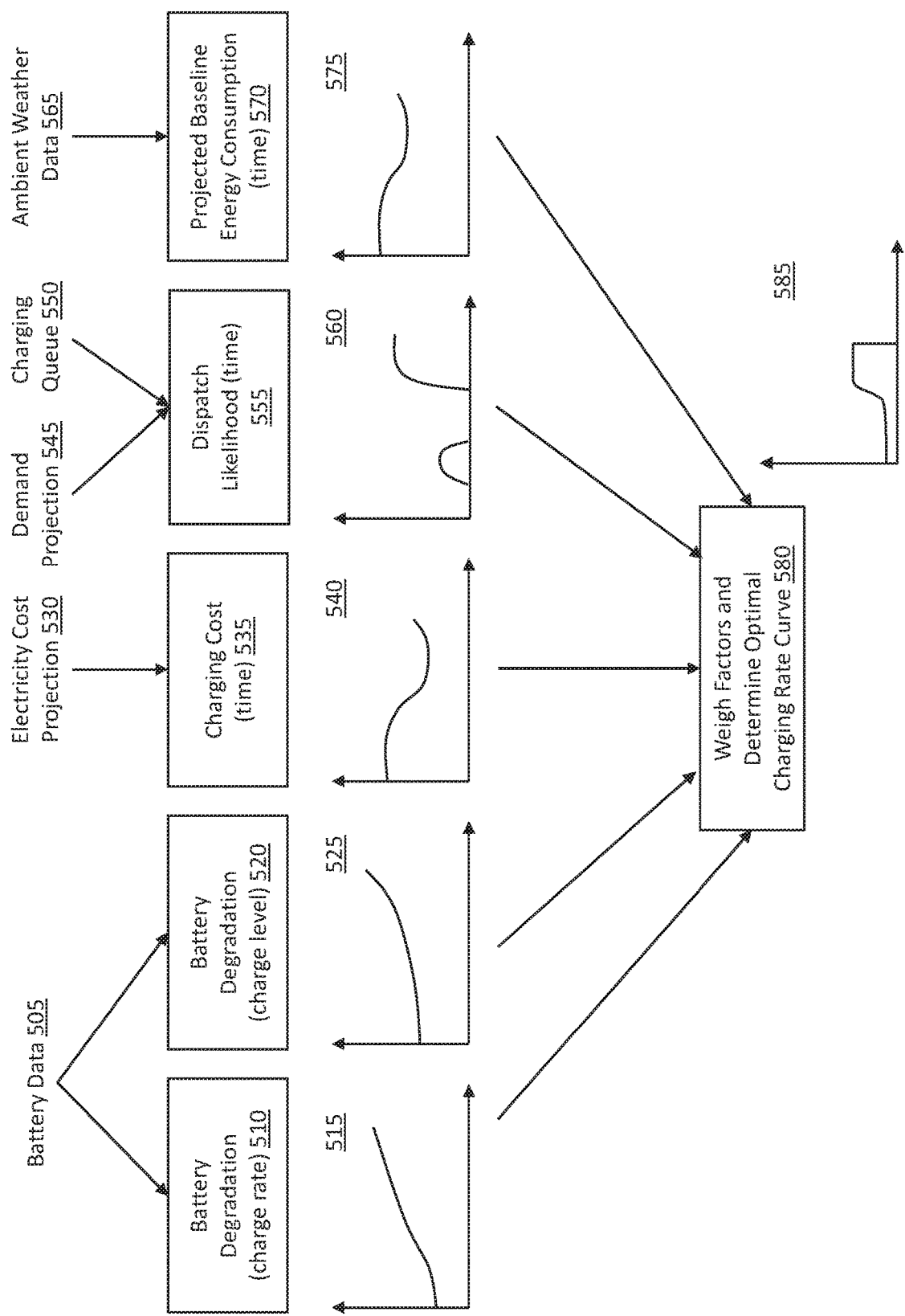
FIG. 5 is a flowchart showing a process for determining an optimal charging rate curve according to some embodiments of the present disclosure.

In some embodiments, the charging rate selector 350 selects a charging rate curve that includes multiple different charging rates used at different times during charging of the EV 110. For example, the charging rate curve includes the second charging rate and at least a third charging rate; the battery 150 is charged at the second charging rate (e.g., a relatively slow rate) for a first period of time, and the battery 150 is charged at the third charging rate (e.g., a relatively fast rate) for a second period of time. The rate may vary along the charging rate curve based on the price of electricity over time, the degradation cost over time, or other factors or combination of factors. In some embodiments, during a portion of the charging rate curve (e.g., the first period of time), the charging rate is zero, i.e., the battery 150 does not receive a charge. The charging rate selector 350 may select a charging rate of zero for a period of time that the battery 150 has sufficient charge to power subsystems that remain on while the EV 110 is out of service, and it is undesirable to begin charging the battery 150, e.g., to avoid battery degradation, or because energy costs are high. The charging rate selector 350 may select a charging rate of zero for a period that the EV 110 is queued at the charging station 130 while another EV is being charged. An example of a charging rate curve is shown in FIG. 5.

In selecting the second charging rate, the charging rate selector 350 may account for a power draw on the battery 150 during charging of the EV 110. For example, some subsystems, such as the communications subsystem, onboard computer, sensor suite 140, and/or other systems may continue to draw power while the battery 150 is charging. The subsystems may also draw power while the battery 150 is not charging, but before the EV 110 is put into service, e.g., while the EV 110 is waiting to be charged, or after the battery 150 is charged and before the EV 110 is assigned to a task. The charging rate selector 350 determines the power draw on the battery 150 during charging of the EV 110 and/or during other times before the EV 110 is put into service, and calculates the second charging rate as a rate that charges the battery in time for the anticipated dispatch time, accounting for the power draw on the battery 150 before the EV 110 is put into service.

The charging rate selector 350 may change the second charging rate or the charging rate curve during charging if any of the data that was used to select the second charging rate changes while the EV 110 is charging. For example, if the dispatch predictor 340 updates the anticipated dispatch time to an earlier time than it initially predicted, the charging rate selector 350 may increase the second charging rate so that the EV 110 is charged faster. As another example, if the charging station manager 320 indicates that other EVs in a queue for the charging station 130 have left the queue to charge at other charging stations, the charging rate selector 350 may decrease the second charging rate.

In some embodiments, the charging rate selector 350 selects a charging station 130 of a set of available charging stations for the EV 110 to receive the charge from based on the selected charging rate. If multiple charging stations are available to the EV 110, the charging rate selector 350 may select a charging station that has at least the selected charging rate; the selected charging station may not be the charging station with the fastest charging rate. For example, the first charging rate is a charging rate provided by a first type of charger (e.g., a DC fast-charge charger) having a first maximum charging rate (e.g., 100 kW), and a second type of charger (e.g., an AC charger that delivers up to 20 kW) is also available to the EV 110. If the charging rate selector 350 determines that the second charging rate is less than the maximum charging rate provided by the second type of charger (e.g., the second charging rate is 15 kW), the charging rate selector 350 instructs the EV 110 to maneuver to the second type of charger (e.g., the AC charger) for charging at the second charging rate. This leaves the faster charging station available to other EVs. In some embodiments, the charging rate selector 350 may select a charging station for the EV 110 based on other factors, such as the queue of vehicles to be charged at a charging station, the cost of charging at a charging station, and charging station location.

Example Processes for Selecting and Applying a Charging Rate

FIG. 4 is a flowchart showing a process for selecting and applying a charging rate for an EV according to some embodiments of the present disclosure. An EV, such as EV 110, reaches 410 a charging station, such as charging station 130. The EV 110 may connect, or be connected to, to the charging station 130, e.g., with the cord and plug shown in FIG. 1, through a wireless communications connection, and/or through a wireless charging connection. In some embodiments, the EV 110 can connect to the charging station 130 to receive power autonomously, e.g., without a manual connection. In other embodiments, the EV 110 is manually plugged into the charging station 130. In response to the EV 110 connecting to the charging station 130, the EV 110 and/or the charging station 130 transmits a signal to the fleet management system 120 indicating that the EV 110 has connected to the charging station 130.

A charging manager, such as charging manager 240, calculates 420 an available dispatch time for the EV. As described in relation to FIG. 3, the dispatch predictor 340 may calculate the target charge level, and the battery analyzer 310 may calculate the available dispatch time as the time for the battery 150 to reach the target charge level at a fast charging rate, e.g., the fastest charging rate allowed by the combination of the EV 110 and the charging station 130. The charging manager 240 also calculates an anticipated dispatch time for the EV 110. As described in relation to FIG. 3, the dispatch predictor 340 may calculate the anticipated dispatch time based on a fleet-wide demand projection determined by the demand prediction system 230.

The charging manager 240 compares 440 the anticipated dispatch time to the available dispatch time. If the anticipated dispatch time is less than or equal to the available dispatch time, i.e., the EV 110 is predicted to be dispatched before or at the same time that the battery 150 is expected to reach the target charge level at the fast charging rate, the charging manager 240 selects 450 the fast charging rate. If the anticipated dispatch time is greater than the available dispatch time, i.e., the EV 110 is predicted to be dispatched after the battery 150 is expected to reach the target charge level at the fast charging rate, the charging manager 240 selects 460 a slow charging rate. As described with relation to FIG. 3, the charging rate selector 350 may calculate the slow charging rate based on various factors, such as electricity costs, degradation costs, demand projections, etc. An example of factors that contribute to calculating the slow charging rate is shown in FIG. 5.

The charging station 130 charges 470 the EV 110 at the selected charging rate. The charging manager 240 may transmit the selected charging rate to the charging station 130 which charges the EV 110 at the selected rate, or to the EV 110 which requests power from the charging station 130 at the selected rate. The charging manager 240 may receive updates from the EV 110, the charging station 130, and other EVs in the fleet, and adjust the charging rate as needed based on the updated data.

FIG. 5 is a flowchart showing a process for determining an optimal charging ate curve according to some embodiments of the present disclosure. The process may be performed by the charging manager 240 based on data received from various data sources. In this example, the charging manager 240 receives battery data 505, an electricity cost data 530, a demand projection 545, a charging queue 550, and ambient weather data 565. In other embodiments, the charging manager 240 may receive additional types of data for determining the charging rate curve.

Based on the battery data 505, the charging manager 240 (e.g., the battery analyzer 310) determines two curves 510 and 520 for battery degradation: battery degradation as a function of charge rate 510 and battery degradation as a function of charge level 520. Two example curves 515 and 525 are shown in FIG. 5. The example curve 515 showing battery degradation as a function of charge rate shows that as the charge rate increases, the battery degradation cost also increases. The example curve 525 showing battery degradation as a function of charge level shows that as the charge level increases, the battery degradation cost also increases. In other words, in this example, applying a faster charge rate degrades the battery 150 faster than applying a slower charge rate, and storing a higher charge level degrades the battery 150 faster than storing a lower charge level. In other examples, the battery degradation curves are different from the examples 515 and 525 shown in FIG. 5.

The electricity cost data 530 may be determined by the electricity rate planner 330, or received from another source, e.g., an electricity company. The electricity cost data 530 may include current electricity cost data, historical electricity cost data, and/or projected electricity costs. Based on the electricity cost data 530, the charging manager 240 (e.g., the electricity rate planner 330) determines a charging cost 535 as a function of time. An example charging cost curve 540 shows that at the current time, the charging cost (e.g., cost per kWh) is relatively high, stays relatively high for a period of time, and at a later time, drops to a relatively lower cost. For example, the charging cost may be higher during the daytime and drop lower at nighttime.

The demand projection 545 is provided by the demand prediction system 230. The demand projection 545 may include data describing projected demand across a fleet of EVs or across some segment or segments of the EV fleet. The charging queue 550 is a queue for the charging station 130 that the EV 110 is at or is navigating to. The charging queue 550 may be maintained by the fleet management system 120 (e.g., the charging station manager 320) if, for example, the fleet management system 120 operates a network of charging stations or the EV 110 is navigating to a charging station controlled by the fleet management system 120. Alternatively, the charging queue 550 may be provided by the charging station 130.

Based on the demand projection 545 and the charging queue 550, the charging manager 240 (e.g., the dispatch predictor 340) determines a dispatch likelihood 555 as a function of time. In this example, the dispatch likelihood 555 is a likelihood that the EV 110 is dispatched from the charging station 130 to meet service demands and/or to free the charging station 130 for another EV in the queue. The dispatch likelihood 555 may be used to determine the anticipated dispatch time, described above. An example dispatch likelihood curve 560 shows that initially, the dispatch likelihood is zero (e.g., because the battery 150 needs to be charged and/or one or more EVs are queued for charging ahead of the EV 110); after a period of time, there is a low spike in dispatch likelihood, followed by another period of zero, and then a larger spike in dispatch likelihood. For example, the spikes in the dispatch likelihood curve 560 may correlate with demand levels for a ride service that experiences demand in the evening (the first spike) and in the morning (the second spike).

The ambient weather data 565 may be provided by a weather data provider, by sensors on the EV 110, or other sources of weather data. The charging manager 240 (e.g., the battery analyzer 310) determines a projected baseline energy consumption 570 of the EV 110 as a function of time. The baseline energy consumption is energy used to run systems that are on both during charging and during service, such as HVAC, AV hardware, communications systems, etc. An example projected baseline energy consumption curve 575 shows that the energy consumption dips in the later portion of the curve, e.g., during night time when HVAC demands may be lower in a warm climate. Additional or alternative data, such as usage data or other environment data, may be used to determine the projected baseline energy consumption 575.

The charging manager (e.g., the charging rate selector 350) weighs the factors 510, 520, 535, 555, and 570 to determine 580 an optimal charging rate curve. The charging rate selector 350 may mathematically combine the various curves 510, 520, 535, 555, and 570, apply different weights to different curves, apply a set of rules to process the curves, or apply other techniques to determine the optimal charging rate curve. An example charging rate curve 585 generated from the example curves 515, 525, 540, 560, and 575 is shown. The charging rate curve 585 shows that the charging station 130 charges the EV 110 at a relatively slow rate for a period, and then charges the EV 110 at a faster rate, before disengaging from the EV 110, e.g., after the EV 110 reaches a full charge. The optimized charging rate curve 585 takes advantage of the lower energy costs and minimizes battery degradation. If the EV 110 is charged according to the optimized charging rate curve 585, the EV 110 is not dispatched during the first demand spike shown in the demand likelihood curve 560, but is dispatched for the second, larger demand spike. In this example, the charging rate selector 350 optimized to lower overall costs and to have the EV 110 available to provide service during second projected demand spike; however, the EV 110 is not available to service the first projected demand spike.

SELECT EXAMPLES

Example 1 provides a method for selecting a charging rate for an electric vehicle (EV) including determining an available dispatch time for the EV based on a current charge level of a battery of the EV, a first charging rate, and a target charge level; determining an anticipated dispatch time for the EV based on predicted demand for a fleet of EVs, the fleet including the EV; in response to determining that the available dispatch time is earlier than the anticipated dispatch time, selecting a second charging rate that is lower than the first charging rate; and instructing the EV to be charged at the second charging rate.

Example 2 provides the method according to example 1, where the available dispatch time is a time at which the battery of the EV reaches the target charge level.

Example 3 provides the method according to example 2, where determining the available dispatch time includes determining a predicted usage of the EV following charging of the EV; calculating, as the target charge level, a charge level of the battery of the EV that is sufficient for carrying out the predicted usage of the EV; and determining the available dispatch time as a time at which the battery of the EV, being charged at the first charging rate, reaches the target charge level.

Example 4 provides the method according to any of the preceding examples, where the first charging rate is a maximum charging rate provided by a charging station available to an EV for charging the battery of the EV.

Example 5 provides the method according to any of the preceding examples, where determining the anticipated dispatch time for the EV includes identifying a segment of the fleet of EVs, the segment comprising the EV; retrieving a predicted demand curve for the segment of the fleet, the predicted demand curve calculated based on previous demands on the segment of EVs; and determining the anticipated dispatch time for the EV based on the predicted demand curve.

Example 6 provides the method according to example 5, where determining the anticipated dispatch time for the EV further includes retrieving segment data describing EVs in the segment of the fleet of EVs, the segment data including at least one of location information for the EVs in the segment, battery levels for the EVs in the segment, and assignments of the EVs in the segment; and determining the anticipated dispatch time for the EV further based on the retrieved segment data.

Example 7 provides the method according to any of the preceding examples, where the second charging rate is a rate that charges the battery of the EV to at least the target charge level in time for the anticipated dispatch time.

Example 8 provides the method according to any of the preceding examples, where selecting the second charging rate includes determining a power draw on the battery of the EV during charging of the EV, and calculating the second charging rate as a rate that charges the battery of the EV in time for the anticipated dispatch time, accounting for the power draw on the battery during charging of the EV.

Example 9 provides the method according to any of the preceding examples, the method further including calculating a charging rate curve, the charging rate curve comprising the second charging rate and at least a third charging rate, wherein the battery of the EV is charged at the second charging rate for a first period of time and the battery of the EV is charged at the third charging rate for a second period of time.

Example 10 provides the method according to example 9, where the second charging rate is zero, and during the first period of time the battery of the EV does not receive a charge.

Example 11 provides the method according to any of the preceding examples, the method further including retrieving data describing degradation costs on the battery based on at least one of charging rates and charge levels; retrieving data describing anticipated energy costs for charging the battery; and calculating the second charging rate as an optimal charging rate that minimizes overall costs on the battery based on the retrieved degradation cost data and anticipated energy cost data.

Example 12 provides the method according to any of the preceding examples, further including retrieving data describing weather conditions in the environment of the EV; determining an anticipated power draw on the battery of the EV during a predicted usage of the EV based on the weather conditions; and determining the available dispatch time based on the anticipated power draw.

Example 13 provides the method according to any of the preceding examples, further including retrieving data describing a projected route for the EV, determining an anticipated power draw on the battery of the EV based on the data describing the projected route, and determining the available dispatch time based on the anticipated power draw.

Example 14 provides the method according to any of the preceding examples, where the first charging rate is a charging rate provided by a first type of charger having a first maximum charging rate, the method further including determining that the second charging rate is less than a second maximum charging rate provided by a second type of charger, the second maximum charging rate less than the first maximum charging rate; and instructing the EV to maneuver to the second type of charger for charging at the second charging rate.

Example 15 provides a system for charging an electric vehicle (EV) of a fleet of EVs. The system includes a charging manager and a charging station. The charging manager is configured to determine an available dispatch time for the EV based on a current charge level of a battery of the EV and a first charging rate; determine an anticipated dispatch time for the EV based on predicted demand for the fleet of EVs; and in response to determining that the available dispatch time is earlier than the anticipated dispatch time, select a second charging rate that is lower than the first charging rate. The charging station is configured to receive an instruction to charge the EV at the second charging rate, and charge the EV at the second charging rate.

Example 16 provides the system according to example 15, where the charging manager is further configured to determine a power draw on the battery of the EV during charging of the EV, and calculate the second charging rate as a rate that charges the battery of the EV in time for the anticipated dispatch time, accounting for the power draw on the battery during charging of the EV.

Example 17 provides the system according to any of examples 15 or 16, where the charging manager is further configured to retrieve data describing degradation costs on the battery based on at least one of charging rates and charge levels, retrieve data describing anticipated energy costs for charging the battery, and calculate the second charging rate as an optimal charging rate that minimizes overall costs on the battery based on the retrieved degradation cost data and anticipated energy cost data.

Example 18 provides a non-transitory computer-readable medium storing instructions for selecting a charging rate for an electric vehicle (EV). The instructions, when executed by a processor, cause the processor to determine an available dispatch time for the EV based on a current charge level of a battery of the EV, a first charging rate, and a target charge level; determine an anticipated dispatch time for the EV based on predicted demand for a fleet of EVs, the fleet comprising the EV; in response to determining that the available dispatch time is earlier than the anticipated dispatch time, select a second charging rate that is lower than the first charging rate; and instruct the EV to be charged at the second charging rate.

Example 19 provides the non-transitory computer-readable medium according to example 18, where the instructions for selecting the second charging rate cause the processor to determine a power draw on the battery of the EV during charging of the EV, and calculate the second charging rate as a rate that charges the battery of the EV in time for the anticipated dispatch time, accounting for the power draw on the battery during charging of the EV.

Example 20 provides the non-transitory computer-readable medium according to example 18 or 19, where the instructions for selecting the second charging rate cause the processor to retrieve data describing degradation costs on the battery based on at least one of charging rates and charge levels; retrieve data describing anticipated energy costs for charging the battery; and calculate the second charging rate as an optimal charging rate that minimizes overall costs on the battery based on the retrieved degradation cost data and anticipated energy cost data.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method for selecting a charging rate for an electric vehicle (EV) comprising:
   determining an available dispatch time for the EV based on a current charge level of a battery of the EV, a first charging rate, and a target charge level;
   identifying a segment of a fleet of EVs, the segment comprising the EV;
   retrieving a predicted demand curve for the segment of the fleet of EVs, the predicted demand curve calculated based on previous demands on the segment of EVs;
   determining an anticipated dispatch time for the EV based on the predicted demand curve;
   in response to determining that the available dispatch time is earlier than the anticipated dispatch time, selecting a second charging rate that is lower than the first charging rate; and
   instructing the EV to be charged at the second charging rate.

2. The method of claim 1, wherein the available dispatch time is a time at which the battery of the EV reaches the target charge level.

3. The method of claim 2, wherein determining the available dispatch time further comprises:
   determining a predicted usage of the EV following charging of the EV;
   calculating, as the target charge level, a charge level of the battery of the EV that is sufficient for carrying out the predicted usage of the EV; and
   determining the available dispatch time as a time at which the battery of the EV, being charged at the first charging rate, reaches the target charge level.

4. The method of claim 1, wherein the first charging rate is a maximum charging rate provided by a charging station available to an EV for charging the battery of the EV.

5. The method of claim 1, wherein determining the anticipated dispatch time for the EV further comprises:
   retrieving segment data describing EVs in the segment of the fleet of EVs, the segment data comprising at least one of location information for the EVs in the segment, battery levels for the EVs in the segment, and assignments of the EVs in the segment; and
   determining the anticipated dispatch time for the EV further based on the retrieved segment data.

6. The method of claim 1, wherein the second charging rate is a rate that charges the battery of the EV to at least the target charge level in time for the anticipated dispatch time.

7. The method of claim 1, wherein selecting the second charging rate further comprises:
   determining a power draw on the battery of the EV during charging of the EV; and
   calculating the second charging rate as a rate that charges the battery of the EV to at least the target charge level in time for the anticipated dispatch time, accounting for the power draw on the battery during charging of the EV.

8. The method of claim 1, further comprising:
   calculating a charging rate curve, the charging rate curve comprising the second charging rate and at least a third charging rate, wherein the battery of the EV is charged at the second charging rate for a first period of time and the battery of the EV is charged at the third charging rate for a second period of time.

9. The method of claim 8, wherein the second charging rate is zero, and during the first period of time the battery of the EV does not receive a charge.

10. The method of claim 1, further comprising:
    retrieving data describing degradation costs on the battery based on at least one of charging rates and charge levels;
    retrieving data describing anticipated energy costs for charging the battery; and
    calculating the second charging rate as an optimal charging rate that minimizes overall costs on the battery based on the retrieved degradation cost data and anticipated energy cost data.

11. The method of claim 1, further comprising:
    retrieving data describing weather conditions in an environment of the EV;
    determining an anticipated power draw on the battery of the EV during a predicted usage of the EV based on the weather conditions; and
    determining the available dispatch time based on the anticipated power draw.

12. The method of claim 1, further comprising:
    retrieving data describing a projected route for the EV;
    determining an anticipated power draw on the battery of the EV based on the data describing the projected route; and determining the available dispatch time based on the anticipated power draw.

13. The method of claim 1, wherein the first charging rate is a charging rate provided by a first type of charger having a first maximum charging rate, the method further comprising:
   determining that the second charging rate is less than a second maximum charging rate provided by a second type of charger, the second maximum charging rate less than the first maximum charging rate; and
   instructing the EV to maneuver to the second type of charger for charging at the second charging rate.

14. A system for charging an electric vehicle (EV) of a fleet of EVs comprising:
   a charging manager configured to:
      determine an available dispatch time for the EV based on a current charge level of a battery of the EV and a first charging rate,
      identify a segment of the fleet of EVs, the segment comprising the EV;
      retrieve a predicted demand curve for the segment of the fleet of EVs, the predicted demand curve calculated based on previous demands on the segment of EVs;
      determine an anticipated dispatch time for the EV based on the predicted demand curve, and
      in response to determining that the available dispatch time is earlier than the anticipated dispatch time, select a second charging rate that is lower than the first charging rate; and
   a charging station configured to:
      receive an instruction to charge the EV at the second charging rate, and
      charge the EV at the second charging rate.

15. The system of claim 14, wherein the charging manager is further configured to:
   determine a power draw on the battery of the EV during charging of the EV; and
   calculate the second charging rate as a rate that charges the battery of the EV in time for the anticipated dispatch time, accounting for the power draw on the battery during charging of the EV.

16. The system of claim 14, wherein the charging manager is further configured to:
   retrieve data describing degradation costs on the battery based on at least one of charging rates and charge levels;
   retrieve data describing anticipated energy costs for charging the battery; and
   calculate the second charging rate as an optimal charging rate that minimizes overall costs on the battery based on the retrieved degradation cost data and anticipated energy cost data.

17. A non-transitory computer-readable medium storing instructions for selecting a charging rate for an electric vehicle (EV), the instructions, when executed by a processor, cause the processor to:
   determine an available dispatch time for the EV based on a current charge level of a battery of the EV, a first charging rate, and a target charge level;
   identify a segment of a fleet of EVs, the segment comprising the EV;
   retrieve a predicted demand curve for the segment of the fleet of EVs, the predicted demand curve calculated based on previous demands on the segment of EVs;
   determine an anticipated dispatch time for the EV based on the predicted demand curve;
   in response to determining that the available dispatch time is earlier than the anticipated dispatch time, select a second charging rate that is lower than the first charging rate; and
   instruct the EV to be charged at the second charging rate.

18. The non-transitory computer-readable medium of claim 17, wherein the instructions for selecting the second charging rate cause the processor to:
   determine a power draw on the battery of the EV during charging of the EV; and
   calculate the second charging rate as a rate that charges the battery of the EV in time for the anticipated dispatch time, accounting for the power draw on the battery during charging of the EV.

19. The non-transitory computer-readable medium of claim 17, wherein the instructions for selecting the second charging rate cause the processor to:
   retrieve data describing degradation costs on the battery based on at least one of charging rates and charge levels;
   retrieve data describing anticipated energy costs for charging the battery; and
   calculate the second charging rate as an optimal charging rate that minimizes overall costs on the battery based on the retrieved degradation cost data and anticipated energy cost data.

\* \* \* \* \*